United States Patent [19]

Maier

[11] Patent Number: 4,876,916

[45] Date of Patent: Oct. 31, 1989

[54] CAST SHAFTS, PARTICULARLY CAMSHAFTS

[75] Inventor: Konrad Maier, Romanshorn, Switzerland

[73] Assignee: Von Roll, AG, Gerlafingen, Switzerland

[21] Appl. No.: 130,413

[22] Filed: Dec. 9, 1987

[30] Foreign Application Priority Data

Dec. 18, 1986 [CH] Switzerland .......................... 5043/86

[51] Int. Cl.⁴ ............................................. F16H 53/00
[52] U.S. Cl. ..................................... 74/567; 123/90.34
[58] Field of Search .............. 74/567; 123/90.6, 90.34; 29/6

[56] References Cited

U.S. PATENT DOCUMENTS

| | | | |
|---|---|---|---|
| 1,469,063 | 9/1923 | Wills | 123/90.34 X |
| 1,489,864 | 4/1924 | Tuttle | 123/90.34 |
| 1,497,503 | 6/1924 | Greuter | 123/90.34 X |
| 3,313,016 | 4/1967 | Seulen et al. | 29/6 |
| 3,352,293 | 11/1967 | Hulten | 123/90.34 X |
| 3,501,976 | 3/1970 | Thompson | 74/567 |
| 3,621,733 | 11/1971 | Seulen et al. | 29/6 X |
| 3,689,986 | 9/1972 | Takahashi et al. | 164/76.1 X |
| 4,072,448 | 2/1978 | Loyd, Jr. | 123/90.6 X |
| 4,449,491 | 5/1984 | Tsuchiyama et al. | 123/90.34 |
| 4,644,912 | 2/1987 | Umeha et al. | 123/90.6 X |

FOREIGN PATENT DOCUMENTS

| | | | |
|---|---|---|---|
| 228413 | 7/1963 | Austria | 164/368 |
| 227704 | 10/1910 | Fed. Rep. of Germany | 164/368 |
| 2905706 | 8/1980 | Fed. Rep. of Germany | 123/90.6 |
| 55-37552 | 3/1980 | Japan | 123/90.34 |
| 55-78114 | 6/1980 | Japan | 123/90.6 |

*Primary Examiner*—Rodney M. Lindsey
*Attorney, Agent, or Firm*—Helfgott & Karas

[57] ABSTRACT

An elongated generally cylindrical iron shaft is cast as a single piece. The shaft has a longitudinal axis and has a centrally disposed longitudinal hollow channel extending completely therethrough along the axis. The shaft has a plurality of transverse channels extending outwardly from the longitudinal channel completely through the shaft to the outside thereof and communicating with the longitudinal channel. Each transverse channel has the shape of a nozzle. The outside openings of the transverse channels are spaced apart and are disposed along a helical path on the outer surface of the shaft. The helix has an axis coincident with the longitudinal axis.

10 Claims, 1 Drawing Sheet

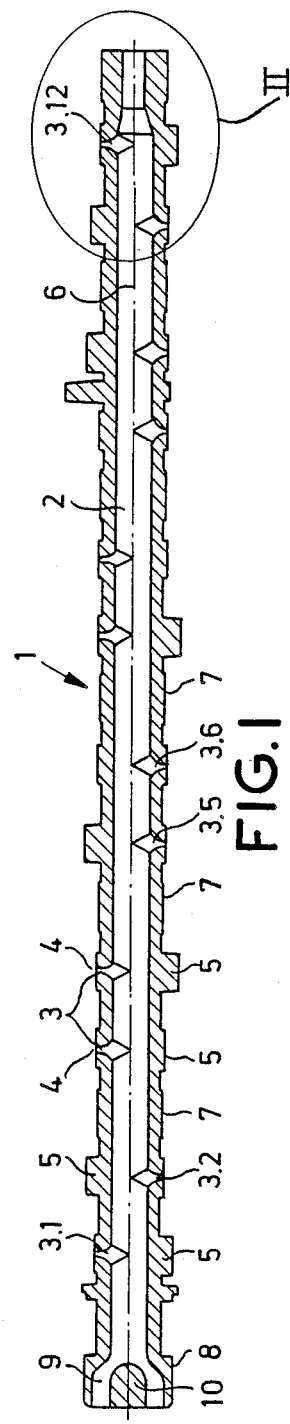
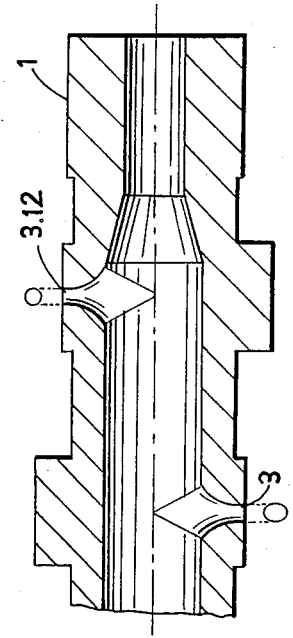

CAST SHAFTS, PARTICULARLY CAMSHAFTS

BACKGROUND OF THE INVENTION

The invention relates to cast shafts, particularly camshafts and other slender or small-diameter shafts, which are cast in one piece and which are provided with a central longitudinal channel cast therein.

Slender, cast shafts are required in large numbers in the form of camshafts for the construction of internal combustion engines. Through the disk cams, called cams, distributed over the length of the shaft, inlet and outlet valves are controlled directly or via a linkage, e.g. push rods and rocker arms. These camshafts which can rotate at half the engine speed are exposed to significantly changing bending and torsional loads. The vibrational behavior of such camshafts is consequently of great significance.

Steel camshafts are particularly used in large internal combustion engines, whereas preference is given to cast camshafts for vehicle engines.

The invention relates to cast iron, cast camshafts, as well as to other similar, slender cast shafts. These shafts advantageously have high damping characteristics and can be manufactured at relatively low cost. A further advantage of the cast shaft is that the central longitudinal channel, such as is provided in many camshafts, can also be provided during the casting operation. This central longitudinal channel serves to supply lubricating oil, e.g. for lubricating the cams and bearing points. For this purpose it is necessary to drill in the camshaft transverse channels branching off the longitudinal channel in order to permit the exit of lubricating oils at predetermined points distributed over the length of the camshaft as disclosed, for example, in U.S. Pat. No. 3,689,986. An additional machining operation is required for drilling these transverse channels and usually a special drilling machine must be employed. The time and mechanical expenditure required for this operation constitutes an important feature in the overall costs involved in the manufacture of the camshaft.

SUMMARY OF THE INVENTION

It is an object of the present invention to so develop cast shafts of the aforementioned type, that the manufacturing costs for the transverse channels are significantly reduced, and at the same time shaft weight can be reduced.

In accordance with the principles of the invention, an elongated generally cylindrical iron shaft is cast as a single piece. The shaft has a longitudinal axis and has a centrally disposed longitudinal hollow channel extending completely therethrough along the axis. The shaft has a plurality of transverse channels extending outwardly from the longitudinal channel completely through the shaft to the outside thereof and communicating with the longitudinal channel. Each transverse channel has the shape of a nozzle. The outside openings of the transverse channels are spaced apart and are disposed along a helical path on the outer surface of the shaft. The helix has an axis coincident with the longitudinal axis.

Thus, in the casting are provided cast-in transverse channels branching from the longitudinal channel and which are constructed as nozzles, the openings of said nozzles being arranged in spaced manner both on the circumference and over the length of the shaft along a helical path as described above. Thus, there is no manufacturing expenditure for drilling the transverse channels. It is appropriate for the openings of these nozzles to have a shape differing from the circular, e.g. an oval shape with a larger axis extending in the circumferential direction.

The invention also relates to a cast shaft blank, which makes it possible to manufacture the inventive shaft in an optimum manner. According to the invention this problem is solved in that at least one end face of the blank is cast a connection at least partly covering the longitudinal channel with a central pin or web for the arrangement of a machining center or a thread.

The foregoing as well as additional objects and advantages of the invention will either be explained or will become apparent to those skilled in the art when this specification is read in conjunction with the brief description of the drawings and the detailed description of preferred embodiments which folow.

BRIEF DESCRIPTION OF THE DRAWINGS

FIG. 1 shows one embodiment of the invention in the form of a longitudinal section through a cast camshaft with a cast-on connection for the arrangement of a machining center or a thread and FIG. 2 is a right-hand portion II of FIG. 1, on enlarged scale.

DETAILED DESCRIPTION OF PREFERRED EMBODIMENTS

The drawing shows in section a cast camshaft 1. It is apparent therefrom that the camshaft 1 is cast with a central longitudinal channel 2 and with transverse channels 3 branching from the longitudinal channel 2. For a more precise designation, the transverse channels 3 are designated from left to right as 3.1, 3.2 . . . 3.12. In the case of the camshaft 1 in the drawing, the transverse channels 3 are arranged in such a way that their openings 4 issue onto the surface of the cams 5. In the present construction of camshaft 1, the transverse channels 3 are located in a common diagonal plane intersecting the longitudinal axis 6 of longitudinal channel 2. This simplifies the manufacture of the die. However, it would fundamentally also be possible to place the transverse channels 3 in different diagonal planes, but this would involve greater expenditure for the necessary dies. However, this may be justified in certain cases. Longitudinal channel 2 and transverse channels 3 are used for lubricating the camshaft, particularly the bearing points and the disk cams forming cams 5. However, it is important that the longitudinal channel 2 has a much larger cross-section than the sum of all the opening cross-sections of transverse channels 3, so that a corresponding pressure can be maintained in longitudinal channel 2 over the entire length of the camshaft. The opening cross-section of a single transverse channel 3 is consequently smaller by a multiple than the cross-section of longitudinal channel 2, that is the cross sectional area of the longitudinal channel is N times as large as the cross-sectional area of any transverse channel opening, where N is an integer in excess of one. The cross-section of longitudinal channel 2 can e.g. be twice the sum of the opening cross-sections of transverse channels 3.

As seen in FIG. 1, each transverse channel 3 narrows towards the peripheral surface of shaft 1 to form a nozzle of venturi shape.

In the drawing, all the transverse channels 3, i.e. transverse channels 3.1 to 3.12 are located on cams 5 and the camshaft shown in the drawing is intended for a six-cylinder in-line engine with in each case one cam for an inlet and an outlet valve, and are used for improving the lubrication at the contact bases between a valve shaft or a linkage surface and the cam face. However, it is also possible to position the transverse channels 3 in the bearing parts 7 or between the cams 5 and said bearing part 7. However, it is possible in all cases to cast the transverse channels 3 together with the longitudinal channel 2 during the casting of camshaft 1.

The drawing also shows that the transverse channels 3 are nozzle-shaped, which avoids sharp edges with the known notch effects and as a result the core portions at the transition to the longitudinal channel core can be strengthened.

Openings of channels 3 at the outside surface of the shaft 1 may be circular in cross-section as shown in the upper part of FIG. 2 or oval in cross-section, as shown in the lower part of the shaft in FIG. 2.

At one end the blank of camshaft 1 has a sprue machined to a connection 8 as an extension of the camshaft. This connection has two facing flat channels 9, which partly embrace a material web 10 aligned with longitudinal channel 2. The material web 10 permits the arrangement of a machining centre, which facilities the machining of camshaft 1 to the final dimensions. However, it is also possible to provide in connection 8 a thread, e.g. an internal thread in web 10 for fixing a driving gear. The blank can be cast e.g. in chilled cast iron, both with lamellar and spheroidal graphite.

If a longitudinal channel 2 with an even larger cross-section is provided in camshaft 2 for reducing the weight, the alloy must satisfy the special condition that on casting a pearlitic-sorbitic crystalline metallurgical structure with a precise spheroidal form is obtained. The following alloy must be used (in % by weight):

Carbon: 2.8 to 3.4%
Silicon: 2.0 to 2.8%
Manganese: max. 0.15%
Tin: 0.1 to 0.5%
Phosphorus: max. 0.06%
Magnesium: 0.035 to 0.06%
Remainder: iron The silicon content is reached by a seeding or inoculating material quantity of at least 0.4%. As a result the following mechanical characteristics are obtained:

Tensile strength $Rm=800-1000$ $N/nm^2$
Brinell hardness $BH30=250-320$ BH
Elongation at breat $A5=2-3\%$ This alloy leads to a ferrite-free structure, which is achieved through the addition of at least 0.1% tin. In addition, a uniform, close-meshed pearlite-sorbite is obtained with the alloying of tin. In order that there is no primary graphite in the structure, which during remelting is gassed and produces bubbles, the C-content is reduced and the degree of saturation is set below 1. The graphite size must be very fine (6 to 8 according to standard . . . ), which is brought about by supplying most of the silicon by inoculation.

The described alloy makes it possible to use inductive or laser hardening, or also the TIG remelting process.

For further reducing the weight of the camshaft 1, bulges can be provided in longitudinal channel 2 corresponding to the outer contour of the shaft, e.g. in the vicinity of cams 5. It is also possible to provide a connection for supplying a machining center or a thread at both ends, as well as on one side of the camshaft 1.

While the invention has been described with detailed reference to the drawings, it will be obvious to those skilled in the art that many modifications and changes can be made within the scope and sphere of the invention as defined in the claims which follow.

What is claimed is:

1. An elongated generally cylindrical iron shaft having a longitudinal axis and a centrally disposed longitudinal channel extending completely therethrough along the axis, the shaft further having a plurality of transverse channels extending outwardly from the longitudinal channel completely through the shaft to the outside thereof and communicating with the longitudinal channel, each transverse channel having the shape of a nozzle and being wider at said longitudinal channel than at outside openings thereof, the outside openings of the transverse channels being spaced apart and disposed along a helical path on an outer surface of the shaft, the helix having an axis coincident with the longitudinal axis, said shaft together with said longitudinal channel and said transverse channels being cast as a single piece.

2. The shaft of claim 1 wherein the openings have a substantially circular cross-sectional shape.

3. The shaft of claim 1 wherein the openings have an oval cross-sectional shape with transversely disposed relatively short and relatively long axes, the long axes extending in a direction at right angles to the longitudinal axis.

4. The shaft of claim 1 wherein all of the openings have like cross-sectional areas, the cross-sectional area of the longitudinal channel being N times as large as the cross-sectional area of a transverse channel opening, where N is an integer larger than 1.

5. The shaft of claim 4 wherein the cross-sectional area of the longitudinal channel is larger than the sum of the cross-sectional areas of all of the openings.

6. The shaft of claim 1 wherein each transverse channel is are disposed in a longitudinal plane in which the longitudinal axis is disposed.

7. The shaft of claim 1 which is a cam shaft, the openings being coincident with a circumferential cam surface.

8. The shaft of claim 1 wherein at least one end face of the shaft has a cast connection which at least partially covers the longitudinal channel and wherein a web is centrally disposed in the connection.

9. The shaft of claim 1 having the following chemical composition as expressed in percent by weight: carbon, 2.8–2.4%,; silicon, 2.0–2.8%; manganese, a maximum of 0.15%; tin, 0.1–0.5%; phosphorous, a maximum of 0.06%; magnesium, 0.035–0.06%; balance, iron.

10. The shaft of claim 9 having pearlitic-sorbitic structure with a precise spheroidal form.

* * * * *